April 27, 1926.

R. HAEMMERLI

BUTT CAP FOR GUNS, ESPECIALLY FOR SHORT RIFLES

Filed Sept. 29, 1923

1,582,395

Inventor:

Patented Apr. 27, 1926.

1,582,395

UNITED STATES PATENT OFFICE.

RUDOLF HAEMMERLI, OF LENZBURG, SWITZERLAND.

BUTT CAP FOR GUNS, ESPECIALLY FOR SHORT RIFLES.

Application filed September 29, 1923. Serial No. 665,691.

*To all whom it may concern:*

Be it known that I, RUDOLF HAEMMERLI, a citizen of the Swiss Confederation, residing at Lenzburg, Switzerland, have invented certain new and useful Improvements in Butt Caps for Guns, Especially for Short Rifles, for which I have obtained a Patent No. 101,632, dated 18th of October, 1922, in Switzerland, and of which the following is a specification.

This invention relates to butt caps for guns and especially for short rifles. According to the invention a cross bolt is arranged in the butt and connected by a connection element with the butt cap in such a manner that at least a part of the connection element is rotatable around the cross bolt in order to adjust the cap with regard to the butt.

The invention will be best understood from a consideration of the following detailed description taken in connection with the accompanying drawing forming a part of this specification, with the understanding that while on the drawing one embodiment of the invention is disclosed, the invention is not confined to any strict conformity with the showing of the drawings, but may be embodied in any manner which does not make a material departure from the salient features of the invention.

In the drawing:—

1 is the butt and 2 the butt cap. On the rear end of the butt a curved piece 3 is fixed by means of screws which has a large aperture and is toothed on the outer surface. The corresponding edges of the hollow butt cap 2 are curved in the same direction and have teeth which engage with the teeth 4 of the curved piece 3, a displacement of the butt cap 2 with regard to the butt in the direction of the arc of circle of the surfaces in contact being thus prevented.

Figure 1:
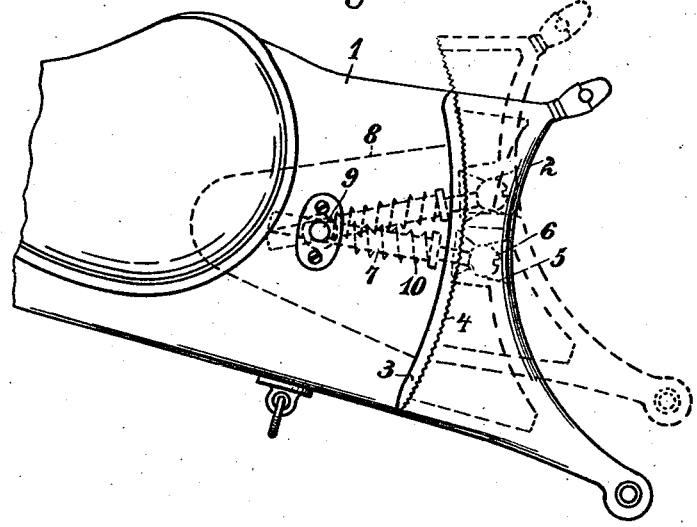
Fig. 1 shows in side elevation the rear part of the butt.
Figure 2:
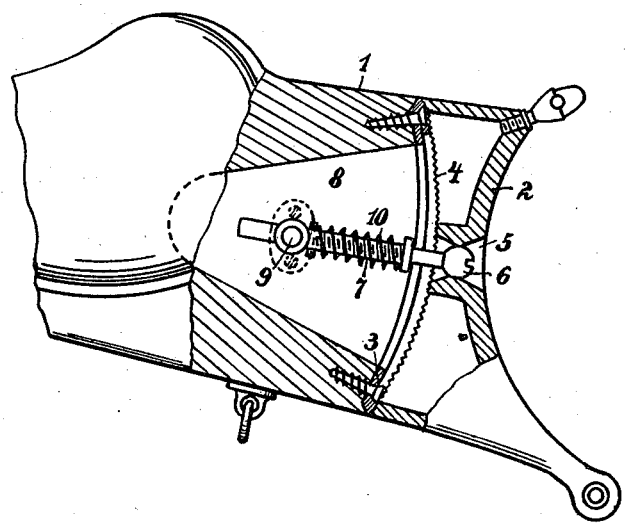
Fig. 2 is a longitudinal section of Fig. 1.

The contact surfaces of butt and butt cap were hitherto straight instead of curved so that the cap 2 had to be displaced with regard to the butt in a straight line. For this reason a more complicated mechanism was required for fixing the cap on the butt. On the middle of the cap 2 a tubular extension with a funnel-shaped bore 5 is arranged in which the ball head 6 of a screw bolt 7 is located which serves for connecting the cap with the butt, this connection forms so to say a ball-joint. The screw bolt 7 projects into a cavity 8 of the butt which is tapered towards the front end. In this cavity 8 a cross bolt 9 is arranged so that it may rotate around its axis but not be displaced. This bolt 9 serves as nut for the screw bolt 7. A pressure spring 10 is mounted on the screw bolt 7 so that one end of the same bears against the cap 2, the other end bearing against the cross bolt 9. This spring 10 has the tendency to push the cap 2 away from the butt 1. If the screw bolt 7 is rotated by means of a screw driver in right hand direction the spring 10 pushes the cap away from the butt so that the teeth of the cap disengage from the teeth of the curved piece 3. The cap 2 may now be displaced along an arc of circle with regard to the butt 1, for instance upward as shown in Fig. 1 in dotted lines, or downward. When the screw bolt is screwed in opposite direction into the nut 9 the teeth of the cap and curved piece engage again with one another so that the cap is secured in the adjusted position on the butt.

Instead of the pressure spring a pull spring might be arranged which pulls the cap against the piston. These springs are however not absolutely necessary.

Instead of the screw bolt any other convenient connecting element might be used which is fixed to or articulated on the cap and connected through an intermediate element, for instance a spring, with the cross bolt 9 so that an articulated connection between cap and cross bolt is ensured.

I claim:—

1. A butt cap for guns, especially for short rifles comprising in combination a butt having a cavity forwardly extending from its rear end, a cross bolt rotatably mounted in said cavity and forming a nut, a screw bolt screwed into said cross bolt and connected with said butt cap so that said screw bolt oscillates when said cap is displaced with regards to the butt.

2. A butt cap for guns, especially for short rifles comprising in combination a butt having a cavity forwardly extending from its rear end, a cross bolt rotatably mounted in said cavity and forming a nut, a butt cap having a funnel-shaped boring at the middle, a screw bolt screwed into said cross bolt, a ball at the rear end of said screw bolt located in said funnel-shaped boring of the cap so that said screw bolt oscillates when said cap is displaced with regard to the butt.

3. A butt cap for guns, especially for short rifles comprising in combination a butt having a cavity forwardly extending from the rear end of the butt and tapering in forward direction, a cross bolt rotatably mounted in said cavity and being constructed like a nut, a cap having a funnel-shaped boring at the middle, a screw bolt screwed into said cross bolt, a ball-shaped rear end of said screw bolt located in said funnel-shaped boring of the cap, a curved plate on the rear end of the butt having a large aperture, teeth on the outer surface of said curved plate, teeth on the front surface of said cap engaging with the teeth on the curved plate, and a spring interposed between said cross bolt and said plate for pulling said cap away toward said butt.

In testimony whereof I affix my signature.

RUDOLF HAEMMERLI.